(12) United States Patent
Hsu et al.

(10) Patent No.: US 7,066,489 B2
(45) Date of Patent: Jun. 27, 2006

(54) INFLATABLE CURTAIN WITH FLUID RELEASE MEANS

(75) Inventors: Kwen Hsu, Rochester Hills, MI (US); William P. Braun, Romeo, MI (US); Charles S. Pillsbury, IV, Rochester, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 265 days.

(21) Appl. No.: 10/465,322

(22) Filed: Jun. 19, 2003

(65) Prior Publication Data

US 2004/0256844 A1    Dec. 23, 2004

(51) Int. Cl.
    *B60R 21/239* (2006.01)
(52) U.S. Cl. .................................. 280/739; 280/730.2
(58) Field of Classification Search ............. 280/730.2, 280/736, 739, 740, 742, 730.1
    See application file for complete search history.

(56) References Cited

U.S. PATENT DOCUMENTS

| | | | |
|---|---|---|---|
| 3,861,712 A * | 1/1975 | Matsui et al. ............... | 280/739 |
| 4,394,033 A * | 7/1983 | Goetz et al. ................ | 280/736 |
| 4,964,652 A * | 10/1990 | Karlow ....................... | 280/739 |
| 5,518,269 A | 5/1996 | Storey et al. | |
| 5,536,038 A | 7/1996 | Bollaert et al. | |
| 5,603,526 A | 2/1997 | Buchanan | |
| 6,131,949 A | 10/2000 | Lewis et al. | |
| 6,142,517 A | 11/2000 | Nakamura et al. | |
| 6,361,071 B1 * | 3/2002 | Denz et al. ................. | 280/739 |
| 6,371,517 B1 * | 4/2002 | Webber et al. .............. | 280/736 |
| 6,431,589 B1 * | 8/2002 | Heigl et al. ............... | 280/730.2 |
| 6,447,006 B1 * | 9/2002 | Hess et al. .................. | 280/739 |
| 6,497,431 B1 * | 12/2002 | Schramm ..................... | 280/736 |
| 6,517,108 B1 | 2/2003 | Vinton et al. | |
| 6,520,522 B1 | 2/2003 | Rothweiler et al. | |
| 6,616,177 B1 * | 9/2003 | Thomas et al. ............. | 280/736 |

* cited by examiner

*Primary Examiner*—David R. Dunn
(74) *Attorney, Agent, or Firm*—Tarolli, Sundheim, Covell & Tummino LLP

(57) ABSTRACT

Apparatus (10) for helping to protect an occupant of a vehicle (12) that has a side structure (16) and a roof (18) includes an inflatable curtain (14). The inflatable curtain (14) is inflatable away from the roof (18) between the side structure (16) of the vehicle (12) and a vehicle occupant. The inflatable curtain has an inflatable volume (28). An inflation fluid source (30) is actuatable to provide inflation fluid to the inflatable volume (28) to inflate the inflatable curtain (14). A fill tube (32) delivers the inflation fluid from the inflation fluid source (30) to the inflatable curtain (14). The apparatus (10) includes an actuatable apparatus (60) for providing an opening (72, 226) in at least one of the fill tube (32) and the inflatable curtain (14) for directing the inflation fluid from the inflatable volume (28) to deflate the inflatable curtain (14). The actuatable apparatus (60) is actuatable in response to actuation of the inflation fluid source (30).

29 Claims, 5 Drawing Sheets

US 7,066,489 B2

INFLATABLE CURTAIN WITH FLUID RELEASE MEANS

FIELD OF THE INVENTION

The present invention relates to an apparatus including means for releasing inflation fluid from an inflatable vehicle occupant protection device. More particularly, the present invention relates to an apparatus including an inflatable curtain and means for releasing inflation fluid from the inflatable curtain.

BACKGROUND OF THE INVENTION

It is known to inflate an inflatable vehicle occupant protection device to help protect a vehicle occupant in the event of a vehicle collision. One particular type of inflatable vehicle occupant protection device is a curtain that is inflatable in the event of a side impact to the vehicle or a vehicle rollover. The inflatable curtain inflates away from the roof of the vehicle downward inside the passenger compartment between a vehicle occupant and the side structure of the vehicle. A known inflatable curtain is inflated with inflation fluid directed from an inflator to the inflatable curtain.

SUMMARY OF THE INVENTION

The present invention relates to an apparatus for helping to protect an occupant of a vehicle that has a side structure and a roof. The apparatus includes an inflatable curtain. The inflatable curtain is inflatable away from the roof between the side structure of the vehicle and a vehicle occupant. The inflatable curtain has an inflatable volume. An inflation fluid source is actuatable to provide inflation fluid to the inflatable volume to inflate the inflatable curtain. A fill tube delivers the inflation fluid from the inflation fluid source to the inflatable curtain. The apparatus includes actuatable means for providing an opening in at least one of the fill tube and the inflatable curtain for directing the inflation fluid from the inflatable volume to deflate the inflatable curtain. The actuatable means is actuatable in response to actuation of the inflation fluid source.

The present invention also relates to an apparatus including an inflatable curtain that is inflatable away from a roof of the vehicle between a side structure of the vehicle and a vehicle occupant. The inflatable curtain includes an inflatable volume. An inflation fluid source is actuatable to provide inflation fluid to the inflatable volume for inflating the inflatable curtain. The apparatus also includes a mechanism for releasing the inflation fluid to flow from said inflatable volume starting a predetermined time after actuation of the inflation fluid source to deflate the inflatable curtain.

The present invention further relates to an apparatus including an inflatable curtain that is inflatable away from a roof of the vehicle between a side structure of the vehicle and a vehicle occupant. An inflation fluid source is actuatable to provide inflation fluid for inflating the inflatable curtain. A fill tube delivers the inflation fluid from the inflator to the inflatable curtain. The fill tube has a portion positioned in the inflatable curtain. The apparatus also includes a device mounted on the fill tube for releasing the inflation fluid from the inflatable curtain.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF PREFERRED EMBODIMENTS

Figure 1:
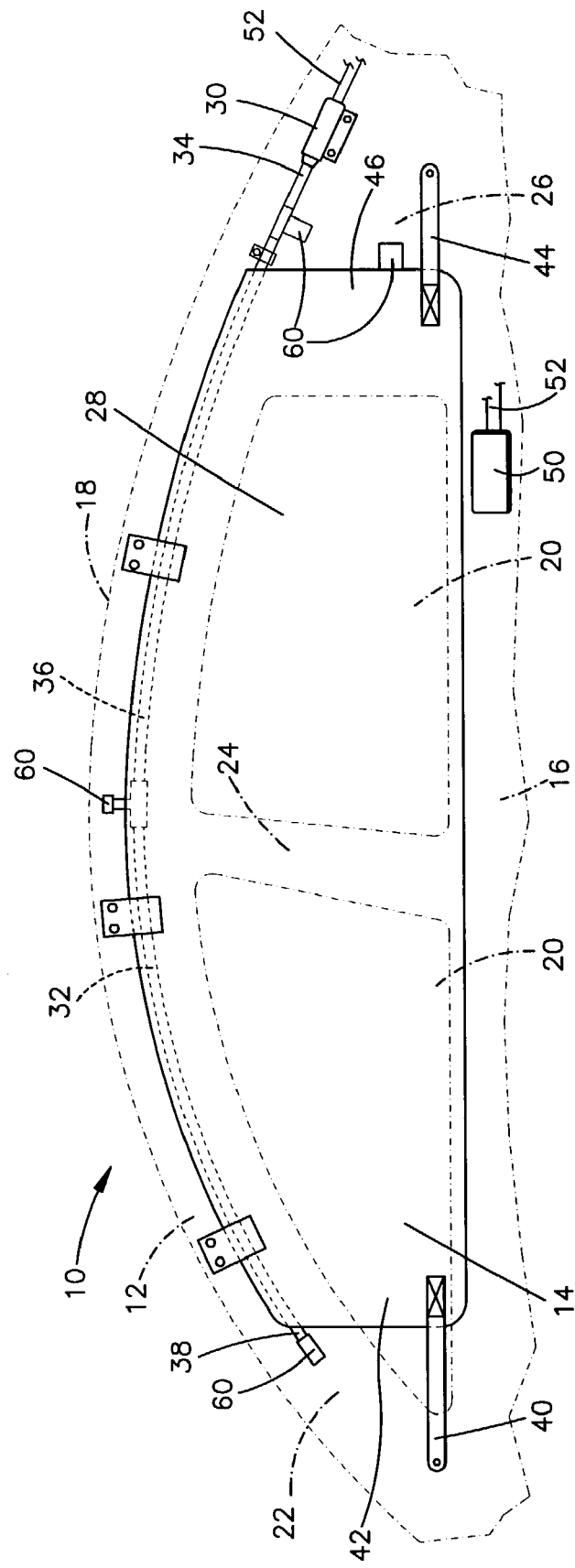
FIG. 1 is a schematic view of an apparatus for helping to protect a vehicle occupant, according to the present invention.

As representative of the present invention, an apparatus 10 helps to protect an occupant of a vehicle 12. As shown in FIG. 1, the apparatus 10 includes an inflatable vehicle occupant protection device in the form of an inflatable curtain 14 that is mounted along the side structure 16 of the vehicle 12 and a roof 18 of the vehicle. The side structure 16 of the vehicle 12 includes side window openings 20, an A pillar 22, a B pillar 24, and a C pillar 26. The vehicle 12 and inflatable curtain 14 may have different configurations from those illustrated in FIG. 1. For example, the side structure 16 of the vehicle could also include a D pillar (not shown), and the inflatable curtain 14 could have internal connections that define inflatable cells or chambers within the curtain.

The inflatable curtain has an inflatable volume 28. An inflator 30 is connected in fluid communication with the inflatable volume 28 of the inflatable curtain 14 through a fill tube 32. The fill tube 32 has a first end portion 34 for receiving fluid from the inflator 30. The fill tube 32 also has a portion 36 disposed in the inflatable curtain 14. As shown on FIG. 1, the fill tube 32 may have a second end portion 38, opposite the first end portion 34, that protrudes from the inflatable curtain 14. The portion 36 of the fill tube 32 has a plurality of openings (not shown) that provide fluid communication between the fill tube 32 and the inflatable volume 28 of the inflatable curtain 14.

The inflator 30 contains a stored quantity of pressurized inflation fluid (not shown) in the form of a gas for inflating the inflatable curtain 14. The inflator 30 alternatively could contain a combination of pressurized inflation fluid and ignitable material for heating the inflation fluid, or could be a pyrotechnic inflator that uses the combustion of gas-generating material to generate inflation fluid. As a further alternative, the inflator 30 could be of any suitable type or construction for supplying a medium for inflating the inflatable curtain 14.

The apparatus 10 has a stored condition (not shown) in which the inflatable curtain 14 is stowed in a deflated condition. When the apparatus 10 is in the stored condition, the deflated inflatable curtain 14 has an elongated configuration and extends along the vehicle roof 18 and along the side structure 16 of the vehicle 12 above the side window openings 20.

The vehicle 12 includes a sensor mechanism 50 (shown schematically in FIG. 1) for sensing the occurrence of an event for which inflation of the inflatable curtain 14 is desired, such as a side impact to the vehicle 12 and/or a rollover of the vehicle. Upon sensing such an event, the sensor mechanism 50 provides an electrical signal over lead wires 52 to the inflator 30. The electrical signal causes the inflator 30 to be actuated in a known manner. The inflator 30 discharges fluid under pressure into the fill tube 32. The fill tube 32 directs the fluid into the inflatable volume 28 of the inflatable curtain 14.

The inflatable curtain 14 inflates under the pressure of the inflation fluid from the inflator 30. The inflatable curtain 14 inflates away from the roof 18 in a downward direction as shown in the drawings and in a downward direction with respect to the direction of forward travel of the vehicle 12 into an inflated position, as illustrated in FIG. 1.

The inflatable curtain 14, when in the inflated position, extends along the side structure 16 of the vehicle 12 and is positioned between the side structure and any occupant of the vehicle. In the embodiment illustrated in FIG. 1, the inflatable curtain 14 extends between the A pillar 22 and the C pillar 26 of the vehicle 12 and may overlie portions of the A pillar, C pillar, and B pillar 24 of the vehicle.

The apparatus 10 may include means, such as tethers, for helping to maintain the inflatable curtain 14 in the inflated position. In the embodiment illustrated in FIG. 1, a first tether 40 connects a front portion 42 of the inflatable curtain 14 to the A pillar 22 of the vehicle 12. A second tether 44 connects a rear portion 46 of the inflatable curtain 14 to the C pillar 26 of the vehicle 12.

The inflatable curtain 14, when being inflated, contracts lengthwise and imparts tension to the tethers and 44. As a result, the inflatable curtain 14 is tensioned along its length between the A pillar 22 and C pillar 26 of the vehicle 12. This helps maintain the inflatable curtain 14 in the inflated position throughout the duration of the event for which inflation of the curtain is desired.

Those skilled in the art will appreciate that the apparatus 10 may include alternative means for helping to facilitate tensioning the inflatable curtain 14 when the curtain is inflated. For example, the apparatus 10 may include a slider mechanism, such as a sliding ratchet mechanism, for connecting the inflatable curtain to the A pillar 22 and C pillar 26. As another example, the rear portion 46 of the curtain 14 may be connected to the vehicle 12 along the C pillar 26 and the front portion 42 could be extended and connected to the vehicle along the A pillar 22. In these two examples, the inflatable curtain 14 would contract lengthwise when inflated and thereby tension itself between the A pillar 22 and C pillar 26. As a further example, the apparatus 10 may include an active device, such as a piston/cylinder arrangement, that is actuatable to apply tension to the inflatable curtain 14.

The inflatable curtain 14, when inflated, helps to protect a vehicle occupant in the event of a vehicle rollover or a side impact to the vehicle 12. The inflatable curtain 14, when inflated, helps to absorb the energy of impacts with the curtain and helps to distribute the impact energy over a large area of the curtain.

Because the inflatable curtain 14 helps protect a vehicle occupant in the event of a side impact to the vehicle 12 or a rollover of the vehicle, it may be desirable to maintain the curtain inflated and pressurized for a longer duration than other inflatable restraints, such as front impact air bags. This is because a rollover event may last substantially longer than other collision events, such as front impacts or even side impacts.

For example, it may be desirable to inflate the inflatable curtain 14 to a pressure in the range of 50–150 kilopascals (kPa). The desired inflation pressure for the inflatable curtain 14 may depend on a variety of factors, such as the construction or dimensions of the curtain, the architecture of the vehicle 12, and the desired performance characteristics for the curtain. It may be further desirable to maintain the inflatable curtain 14 inflated at or above the desired pressure for an extended duration, such as 5–7 seconds or longer.

There are a variety of methods by which the inflatable curtain 14 may be sealed in order to maintain inflation fluid pressure in the curtain for the required duration. For example, the inflatable curtain 14 may be coated with a gas impermeable material in order to help block inflation fluid from leaking from the curtain. As another example, the inflatable curtain 14 could be constructed using a gas impermeable material, such as a plastic film. As a further alternative, the inflatable curtain 14 could have any construction suited to provide complete or substantial gas impermeability.

Once the event for which inflation of the inflatable curtain 14 has ended, it may be desirable for an occupant to exit or be extracted from the vehicle 12. The inflatable curtain 14, having a complete or substantial gas impermeable construction, may remain inflated and pressurized for a period of time extending well beyond the duration of the event. As a result, the inflatable curtain 14 may remain tensioned in the inflated position along the side structure 16 of the vehicle 12 for this extended period of time. This may impede or prevent the exit or extraction of an occupant from the vehicle 12.

According to the present invention, the apparatus 10 is adapted to release inflation fluid from the inflatable volume 28 of the inflatable curtain 14 in order to help facilitate the exit or extraction of an occupant from the vehicle 12 after the event for which inflation of the curtain is desired has ended. The apparatus 10 may be adapted to release inflation fluid from the inflatable volume 28 of the inflatable curtain 14 starting a predetermined time after actuation of the inflator 30. For example, this predetermined time may be at least five seconds or longer. This timing may help ensure that the event for which inflation of the inflatable curtain 14 is desired has ended prior to releasing inflation fluid from the curtain.

According to the present invention, the apparatus 10 includes inflation fluid release means, illustrated schematically at 60 in FIG. 1. The fluid release means 60 is actuatable in response to actuation of the inflator to release inflation fluid from the inflatable volume 28 of the inflatable curtain 14. As shown in FIG. 1, the fluid release means 60 may be associated with the inflatable curtain 14 or the fill tube 32. Each of the fluid release means 60 is actuatable to provide an opening in the inflatable curtain 14 or the fill tube 32 to release inflation fluid from the curtain 14.

The apparatus 10 may include one or more of the fluid release means 60. The fluid release means 60 may be arranged in a variety of positions on the apparatus 10, as illustrated in FIG. 1. For example, the apparatus may include one or more fluid release means 60 spaced along the length of the fill tube 32. As another example, the apparatus 10 may include one or more fluid release means on or otherwise associated with the inflatable curtain 14 at one or more positions on the curtain. As a further example, the apparatus 10 may include plural fluid release means 60, some of which are associated with the inflatable curtain 14, and others of which are associated with the fill tube 32. Also, the fluid release means 60 may be spaced or positioned at locations on the inflatable curtain 14 and/or fill tube 32 other than those illustrated in FIG. 1.

Figure 2:
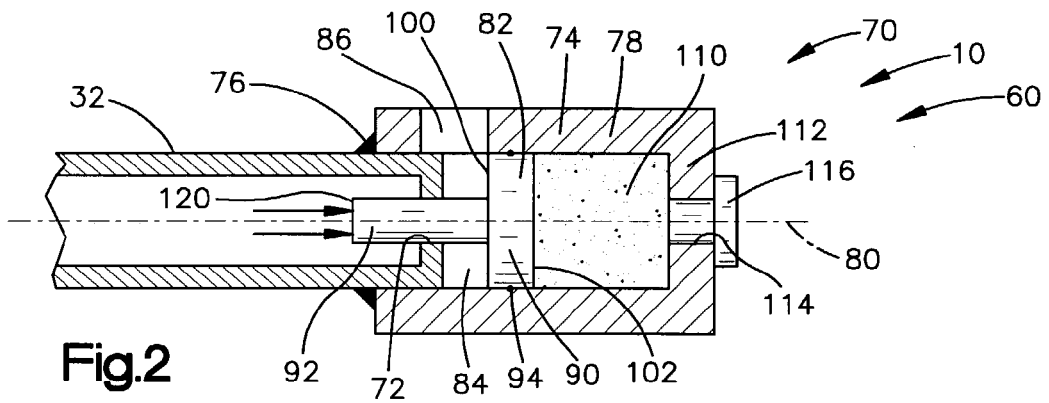
FIGS. 2 and 3 are magnified views, partially in section, of a portion of the apparatus of FIG. 1 showing parts in different positions, according to a first embodiment of the present invention.
Figure 3:
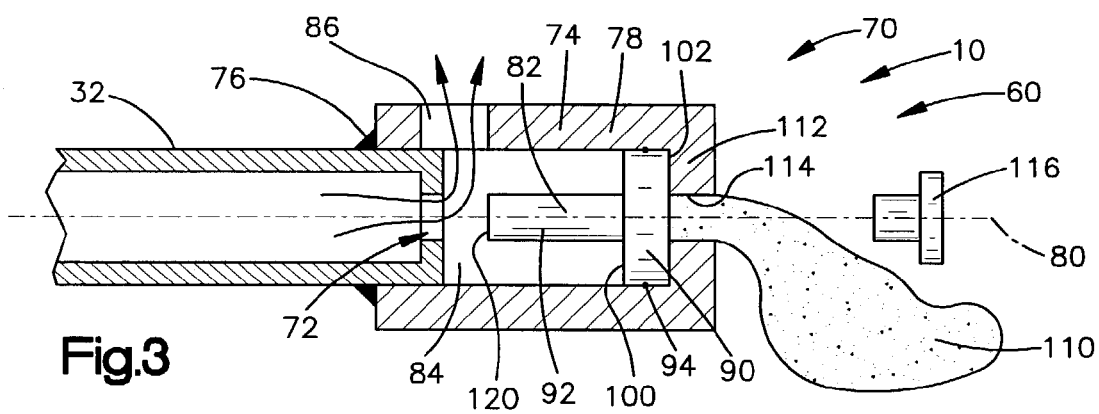

A first embodiment of the present invention is illustrated in FIGS. 2 and 3. According to the first embodiment, the apparatus 10 includes fluid release means 60 associated with the fill tube 32. The fluid release means 60 may be connected to an end portion of the fill tube opposite the inflator 30, as shown in FIG. 1, or may be connected to the fill tube along its length by means, such as a T-shaped fitting, also shown in FIG. 1.

Referring to FIGS. 2 and 3, the fluid release means 60 comprises a device 70, mounted on the fill tube 32, that is actuatable to provide an opening 72 in the fill tube for releasing inflation fluid from the inflatable volume 28 of the inflatable curtain 14 (see FIG. 1). In the embodiment illustrated in FIGS. 2 and 3, the opening 72 comprises an aperture in an end wall of the fill tube 32. The opening 72 could, however, have an alternative configuration. For example, the opening 72 could be an open end of the fill tube 32, an aperture in the side wall of the fill tube, or an aperture in a cap or housing connected to the fill tube.

The fluid release device 70 includes a housing 74 that is connected to the fill tube by means such as a weld 76. The housing 74 could be connected to the fill tube 32 by alternative means, such as screw threads, clamps, or crimping the housing onto the fill tube. In the embodiment illustrated in FIGS. 2 and 3, the housing 74 is a part separate from the fill tube 32. The housing 74 could, however, be formed as an integral part of the fill tube 32 (i.e., as a single piece with the fill tube).

The housing 74 includes a cylindrical side wall 78 that helps define a chamber 84 of the housing. The fill tube 32 may also help define the chamber 84. The housing 74 has a central axis 80 along which the side wall 78 is centered. As shown in FIGS. 2 and 3, the side wall 78 and the fill tube 32 may be aligned with each other along the axis 80. The housing 74 also includes an aperture 86 that provides fluid communication between the chamber 84 and the exterior of the housing. The housing 74 may include one or more such apertures 86.

The fluid release device 70 also includes a member 82 that is disposed in the chamber 84 of the housing 74. The member 82 includes first and second piston portions 90 and 92, respectively. The first piston portion 90 is disposed in the chamber 84 and has a generally cylindrical configuration with a diameter about equal to the inside diameter of the side wall 78 of the housing 74. The first piston portion 90 may include means 94, such as an O-ring, for helping to form a seal between the first piston portion 90 and the side wall 78.

The second piston portion 92 has a generally cylindrical configuration and projects from a first surface 100 of the first piston portion 90 along the axis 80. The second piston portion 92 has a diameter about equal to the diameter of the opening 72. In an unactuated condition of the fluid release device shown in FIG. 2, the second piston portion 92 extends through the opening 72 and into the fill tube 32.

The fluid release device 70 also includes a body of viscous material 110, such as grease, that is disposed in the chamber 84 between the member 82 and an end wall 112 of the housing 74. More particularly, the viscous material 110 is disposed between a second surface 102 of the first piston portion 90, opposite the first surface 100, and the end wall 112 of the housing 74.

The end wall 112 includes an aperture 114 that provides fluid communication between the chamber 84 and the exterior of the housing 74. In the unactuated condition of the fluid release device 70 (FIG. 2), means 116, such as a plug, blocks the aperture 114 to help retain the viscous material 110 in the chamber 84. The means 116 could have alternative configurations, such as a rupturable sheet of plastic or metal foil.

The fluid release device 70 is actuatable in response to actuation of the inflator 30. When the inflator 30 (FIG. 1) is actuated and provides inflation fluid for inflating the inflatable curtain 14 via the fill tube 32, the fluid pressure in the fill tube acts on the second piston portion 92 of the member 82. This is shown in FIG. 2. As illustrated by the arrows in FIG. 2, the inflation fluid acts on an end surface 120 of the second piston portion 92. The inflation fluid urges the member 82 along the axis 80 in the direction of the arrows, i.e., to the right as viewed in FIG. 2.

As the member 82 moves along the axis 80, the first piston portion 90 compresses and pressurizes the viscous material 110 in the chamber 84. When the pressure of the viscous material 110 reaches a predetermined level, the plug 116 is urged out of the aperture 114. This releases the viscous material 110 to flow out of the chamber 84 through the aperture 114. This permits the member 82 to move along the axis 80 toward the end wall 112 under the pressure of the inflation fluid in the fill tube 32.

As the member 82 moves along the axis 80 in the housing 74, it displaces the viscous material 110 from the housing. As a result, the viscous material 110 resists or dampens movement of the member 82 along the axis 80. This slows movement of the member 82 along the axis 80.

As the member 82 moves along the axis 80 in the housing 74, the second piston portion 92 eventually exits the opening 72 in the fill tube 32. This is shown in FIG. 3. When this occurs, inflation fluid is released to flow through the opening 72 in the fill tube 32 and through the aperture 86 in the side wall 78 of the housing 74. The fluid release device 70 is thus actuatable to release or vent inflation fluid from the inflatable volume 28 of the inflatable curtain 14 through the fill tube 32 and the opening 72.

According to the first embodiment of the present invention, the fluid release device 70 (FIGS. 2 and 3) is adapted to release the inflation fluid starting a predetermined time after actuation of the inflator 30 (FIG. 1). This predetermined time may, for example, be at least five seconds. The fluid release device 70 (FIGS. 2 and 3) could be adapted to release inflation fluid after a longer period of time, such as starting at least seven seconds or longer after actuation of the inflator.

The first and second piston portions 90 and 92 of the member 82 and the aperture 114 in the end wall 112 have known dimensions. The viscous material 110 has a known viscosity. As stated above, the apparatus 10 is adapted to inflate the inflatable curtain 14 to a predetermined pressure. Those skilled in the art will appreciate that the inflation fluid will propel the member 82 in the housing 74 at a given rate, which depends on the above values.

The rate at which the viscous material 110 flows out of the chamber determines the amount of time that will elapse between actuation of the inflator 30 and when the pressure release device 70 starts releasing the inflation fluid from the inflatable volume 28. The member 82 and aperture 114 may be sized, and the viscosity of the viscous material 110 may be selected, such that the pressure release device 70 releases the inflation fluid starting a predetermined time (e.g., at least five seconds) after actuation of the inflator.

Figure 4:
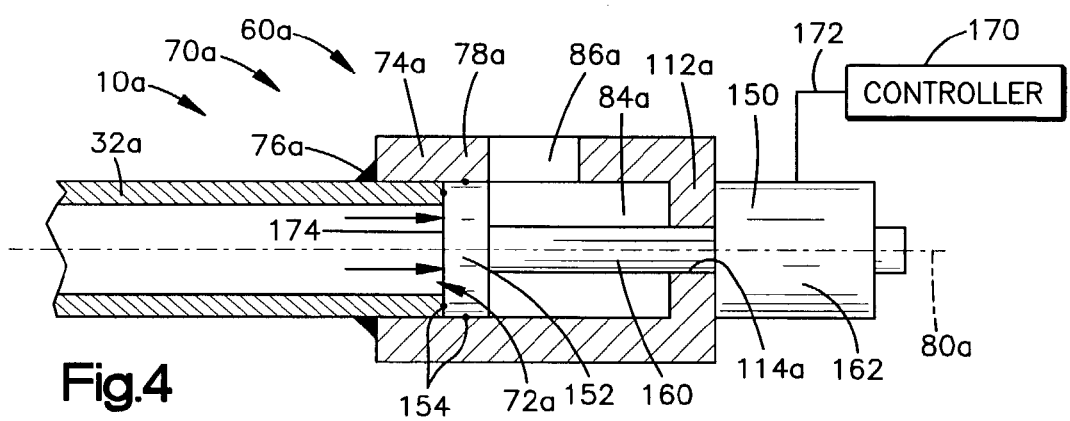
FIGS. 4 and 5 are magnified views, partially in section, of a portion of the apparatus of FIG. 1 showing parts in different positions, according to a second embodiment of the present invention.
Figure 5:
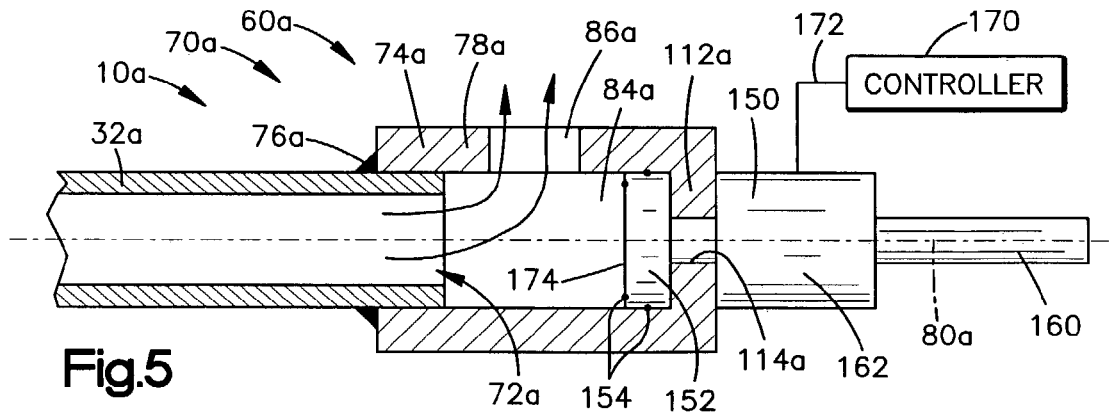

A second embodiment of the present invention is illustrated in FIGS. 4 and 5. The second embodiment of the present invention is similar to the first embodiment of the invention illustrated in FIGS. 2 and 3. Accordingly, reference numbers similar to those of FIGS. 2 and 3 will be utilized in FIGS. 4 and 5, the suffix letter "a" being associated with the reference numbers of FIGS. 4 and 5 to avoid confusion.

According to the second embodiment, the apparatus 10*a* includes fluid release means 60*a* associated with the fill tube 32*a*. The fluid release means 60*a* may be connected to an end portion of the fill tube 32*a* opposite the inflator 30 (see FIG. 1), or may be connected to the fill tube along its length by means such as a T-shaped fitting.

The fluid release means 60*a* comprises a device 70*a*, mounted on the fill tube 32*a*, that is actuatable to provide an opening 72*a* in the fill tube for releasing inflation fluid from the inflatable volume of the inflatable curtain. In the embodiment illustrated in FIGS. 4 and 5, the opening 72*a* comprises an open end of the fill tube 32*a*. The opening 72*a* could, however, have an alternative configuration. For example, the opening 72*a* could be an aperture in an end wall of the fill tube 32*a*, an aperture in the side wall of the fill tube, or an aperture in a cap or housing connected to the fill tube.

The fluid release device 70*a* includes a housing 74*a* that is connected to the fill tube by means such as a weld 76*a*. The housing 74*a* could be connected to the fill tube 32*a* by alternative means, such as screw threads, clamps, or crimping the housing onto the fill tube. In the embodiment illustrated in FIGS. 4 and 5, the housing 74*a* is a part separate from the fill tube 32*a*. The housing 74*a* could, however, be formed as an integral part of the fill tube 32*a* (i.e., as a single piece with the fill tube).

The housing 74*a* includes a cylindrical side wall 78*a* that helps define a chamber 84*a* of the housing. The fill tube 32*a*, when connected with the housing 74*a*, may also help define the chamber 84*a*. The side wall 78*a* of the housing 74*a* is centered on an axis 80*a*. As shown in FIGS. 4 and 5, the side wall 78*a* and the fill tube 32*a* may be aligned with each other along the axis 80*a*. The housing 74*a* also includes an aperture 86*a* that provides fluid communication between the chamber 84*a* and the exterior of the housing. The housing 74*a* may include one or more such apertures 86*a*.

According to the second embodiment of the present invention, the fluid release device 70*a* also includes a device 150, such as a solenoid, that is actuatable to move a member 152 that is disposed in the chamber 84*a* of the housing 74*a*. In the embodiment illustrated in FIGS. 4 and 5, the member 152 comprises a piston that is disposed in the chamber 84*a* of the housing 74*a*. The member 152 has a generally cylindrical configuration with a diameter about equal to the inside diameter of the side wall 78*a* of the housing 74*a*. The member 152 may include means 154, such as an O-ring, for helping to form a seal between the member and the side wall 78*a* or between the member and the fill tube 32*a*.

The member 152 is connected to a shaft 160 of the device 150. The shaft 160 extends from a main body portion 162 of the device 150, positioned on an exterior surface of the housing 74*a*, into the chamber 84*a* through an aperture 114*a* in an end wall 112*a* of the housing.

In the unactuated condition of the fluid release device 70*a* (FIG. 4) the member 152 is positioned against or near the end of the fill tube 32*a*, between the fill tube and the aperture 86*a* in the side wall 78*a*. The member 152 blocks the opening 72*a* and thus blocks fluid communication between the fill tube and the aperture 86*a*. The means 154 may help form a seal that further helps to block the opening 72*a*.

Figure 18:
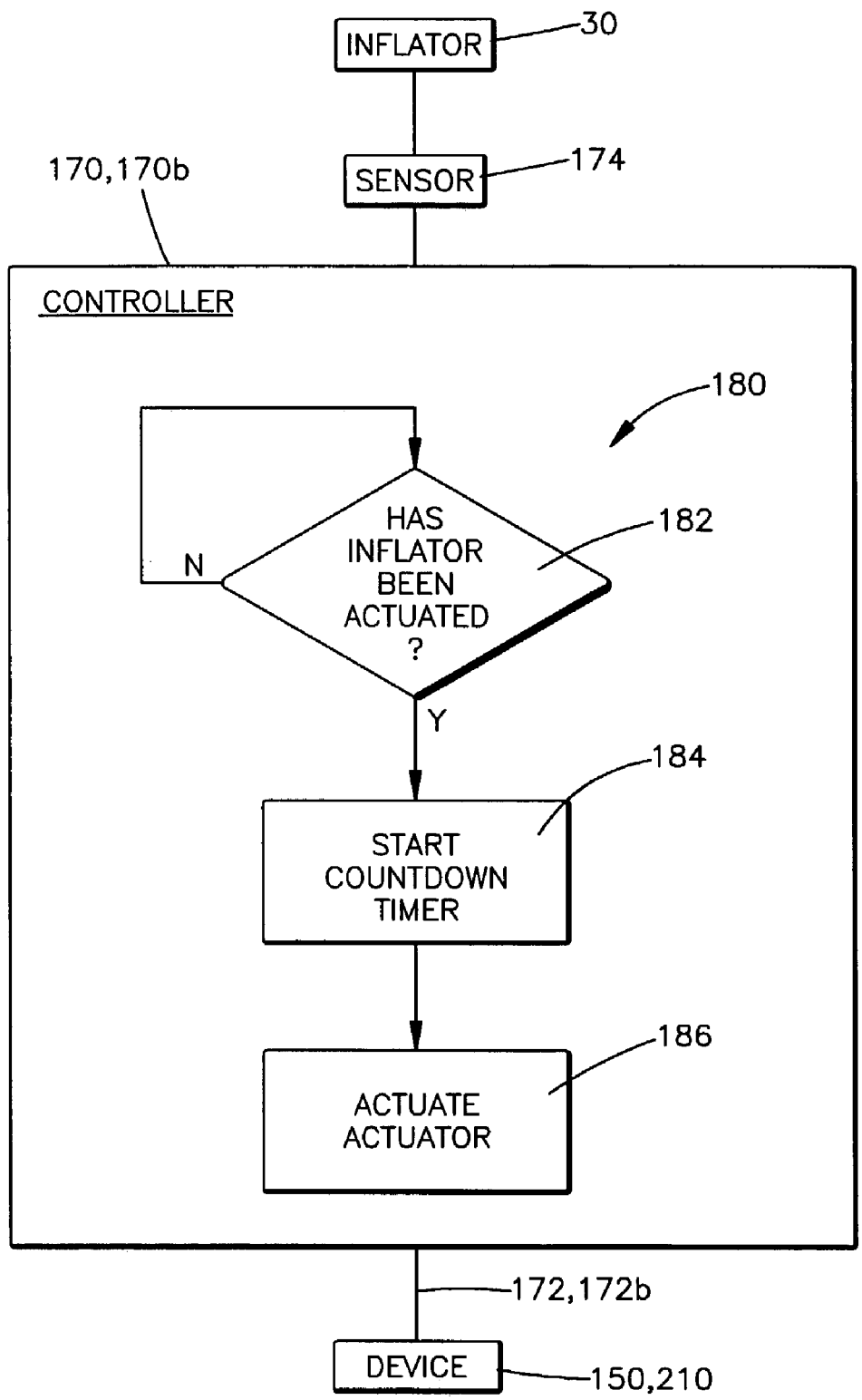
FIG. 18 is a functional block diagram illustrating a process performed by a portion of the apparatus of FIGS. 4–7.

The device 150 is operatively connected to a controller, illustrated schematically at 170, by means 172, such as lead wires. The controller 170 is illustrated in greater detail in FIG. 18. Referring to FIG. 18, the controller 170 is operatively connected to means 174, such as a sensor, for sensing actuation of the inflator 30. For example, the controller may be operatively connected to the sensor 50 of FIG. 1. In this instance, actuation of the inflator 30 may be inferred upon the sensor 50 indicating the occurrence of an event for which inflation of the inflatable curtain 14 is desired. Alternatively, the controller 170 may be operatively connected to means for sensing actuation of an initiator (not shown), such as a squib, of the inflator 30. This may be done, for example, by sensing electrical current flow through the initiator.

The fluid release device 70*a* is actuatable in response to actuation of the inflator 30 (FIG. 1). Referring to FIG. 18, the controller 170 performs a process 180 for determining whether to actuate the device 150. At step 182, the controller 170 determines whether the inflator has been actuated based on the indication provided to the controller by the sensor 174. If actuation of the inflator is not indicated, the process repeats step 182. If actuation of the inflator is indicated, the process 180 proceeds to step 184.

At step 184, a countdown timer begins counting down a predetermined time period. This time period corresponds to the amount of time it is desired to elapse between initiation of the inflator and starting to release inflation fluid from the inflatable curtain. As stated above, this predetermined time period may be at least five seconds, at least seven seconds, or longer. Once the countdown timer times out, the process 180 proceeds to step 186. At step 186, the device 150 is actuated. The controller 180 provides a signal to the device 150 via the lead wires 172 to effectuate its actuation.

When the inflator 30 (FIG. 1) is actuated and provides inflation fluid for inflating the inflatable curtain 14 via the fill tube 32*a* (FIGS. 4 and 5), the fluid pressure in the fill tube acts against the member 152. This is best shown in FIG. 4. As illustrated by the arrows in FIG. 4, the inflation fluid acts on an end surface 174 of the member 152. The device 150 is adapted to lock the shaft 160 in order to block movement of the member 152 along the axis 80*a*. The member 152 is thus maintained in the unactuated position of FIG. 4 and blocks the inflation fluid from escaping the fill tube 32*a*.

At the same time, the controller 180 begins the countdown timer 184. When the timer 184 expires, the controller 170 actuates the device 150. Referring to FIG. 5, when the device 150 is actuated, the shaft 160 is urged along the axis 80a in a direction to the right as viewed in FIG. 5. As a result, the member 152 moves in the housing 74a along the axis 80a away from the unactuated position and thus unblocks the opening 72a.

As the member 152 moves along the axis 80a beyond the aperture 86a, inflation fluid is released to flow from the fill tube through the chamber 84a and out of the pressure release device 70a through the aperture 86a. This is shown in FIG. 5. Inflation fluid is thus released to flow from the inflatable volume 28 (FIG. 1) of the inflatable curtain 14 through the fill tube 32a and the opening 72a (FIG. 5).

The fluid release device 70a is therefore actuatable to release or vent inflation fluid from the inflatable volume 28 (FIG. 1) of the inflatable curtain 14 starting a predetermined time after actuation of the inflator 30 (FIG. 1). This predetermined time may, for example, be at least five seconds. The fluid release device 70a (FIGS. 4 and 5) could be adapted to release inflation fluid after a longer period of time, such as starting at least seven seconds or longer after actuation of the inflator. This time is selectable by programming or otherwise adapting the countdown timer 184 (FIG. 18) of the controller 170.

Figure 6:
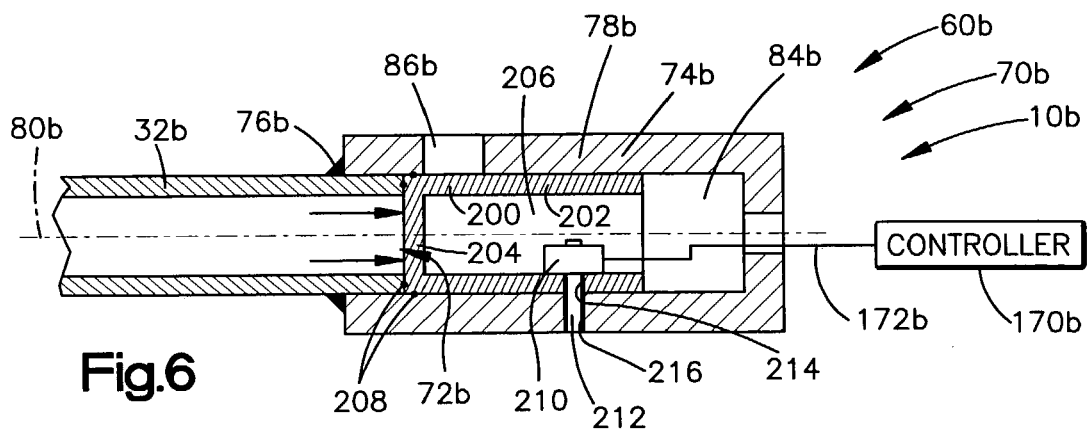
FIGS. 6 and 7 are magnified views, partially in section, of a portion of the apparatus of FIG. 1 showing parts in different positions, according to a third embodiment of the present invention.
Figure 7:
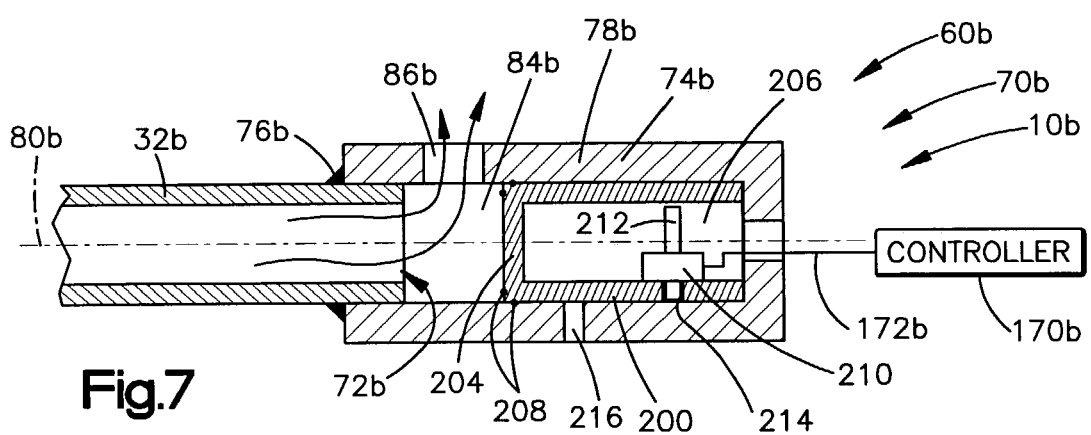

A third embodiment of the present invention is illustrated in FIGS. 6 and 7. The third embodiment of the present invention is similar to the second embodiment of the invention illustrated in FIGS. 4 and 5. Accordingly, reference numbers similar to those of FIGS. 4 and 5 will be utilized in FIGS. 6 and 7, the suffix letter "b" being associated with the reference numbers of FIGS. 6 and 7 to avoid confusion.

According to the third embodiment, the apparatus 10b includes fluid release means 60b associated with the fill tube 32b. The fluid release means 60b may be connected to an end portion of the fill tube 32b opposite the inflator 30 (FIG. 1), or may be connected to the fill tube along its length by means such as a T-shaped fitting.

The fluid release means 60b comprises a device 70b, mounted on the fill tube 32b, that is actuatable to provide an opening 72b in the fill tube for releasing inflation fluid from the inflatable volume 28 (FIG. 1) of the inflatable curtain 14. In the embodiment illustrated in FIGS. 6 and 7, the opening 72b comprises an open end of the fill tube 32b. The opening 72b could, however, have an alternative configuration. For example, the opening 72b could be an aperture in an end wall of the fill tube 32b, an aperture in the side wall of the fill tube, or an aperture in a cap or housing connected to the fill tube.

The fluid release device 70b includes a housing 74b that is connected to the fill tube by means such as a weld 76b. The housing 74b could be connected to the fill tube 32b by alternative means, such as screw threads, clamps, or crimping the housing onto the fill tube. In the embodiment illustrated in FIGS. 6 and 7, the housing 74b is a part separate from the fill tube 32b. The housing 74b could, however, be formed as an integral part of the fill tube 32b (i.e., as a single piece with the fill tube).

The housing 74b includes a cylindrical side wall 78b that helps define a chamber 84b of the housing. The fill tube 32b, when connected with the housing 74b, may also help define the chamber 84b. The side wall 78b of the housing 74b is centered on an axis 80b. As shown in FIGS. 6 and 7, the side wall 78b and the fill tube 32b may be aligned with each other along the axis 80b. The housing 74b also includes an aperture 86b that provides fluid communication between the chamber 84b and the exterior of the housing. The housing 74b may include one or more such apertures 86b.

According to the embodiment of FIGS. 6 and 7, the fluid release device 70b also includes a member 200 that is disposed in the chamber 84b of the housing 74b. In the embodiment illustrated in FIGS. 6 and 7, the member 200 includes a cylindrical side wall 202 having an outside diameter about equal to the inside diameter of the side wall 78b of the housing 74b. The member 200 is slidable in the chamber 84b along the axis 80b.

The member 200 also includes an end wall 204 that closes one end of the member, thus giving the member a generally cylindrical, cup-shaped configuration. This cup-shaped configuration helps define an open chamber 206 of the member 200. The member 200 may include means 208, such as an O-ring, for helping to form a seal between the member and the side wall 78b or between the member and the fill tube 32b.

The member 200 supports a device 210, such as a solenoid, in the chamber 206. The device 210 is actuatable to move a pin 212 from an unactuated position illustrated in FIG. 6 to an actuated position illustrated in FIG. 7. The device 210 is positioned on the member 200 such that pin 212 is extendable through an aperture 214 in the side wall 202 of the member.

When the pressure release device 70b is in the unactuated condition of FIG. 6, the aperture 214 in the side wall 202 is aligned with an aperture 216 in the side wall 78b of the housing 74b. Also, when the pressure release device 70b is in the unactuated condition, the pin 212 extends through the aligned apertures 214 and 216 in the side walls 202 and 78b, respectively. The pin 212 thus blocks movement of the member 200 along the axis 80b, and maintains the member in the unactuated position of FIG. 6.

In the unactuated condition of the fluid release device 70b (FIG. 6), the member 200 is positioned adjacent or near the end of the fill tube 32b, between the fill tube and the aperture 86b in the side wall 78b. The member 200 blocks the opening 72b and thus blocks fluid communication between the fill tube and the aperture 86b. The means 208 may help form a seal that further helps to block the opening 72b.

The fluid release device 70b is actuatable in response to actuation of the inflator 30 (FIG. 1). The device 210 (FIG. 6) is operatively connected to a controller, illustrated schematically at 170b, by means 172b, such as lead wires. The controller 170b is operative to control actuation of the device 210. The controller 170b may be identical both in construction and in function to the controller of the second embodiment, which is described above and illustrated in FIG. 18. The controller 170b may thus control actuation of the device 210 in a manner identical to that described above in regard to the second embodiment. Therefore, a description of the controller 170b in reference to the third embodiment is omitted to avoid repetition.

When the inflator 30 (FIG. 1) is actuated and provides inflation fluid for inflating the inflatable curtain 14 via the fill tube 32b (FIGS. 6 and 7), the fluid pressure in the fill tube acts against the member 200. This is best shown in FIG. 6. As illustrated by the arrows in FIG. 6, the inflation fluid acts on the end wall 204 of the member 200. In the unactuated condition, the device 210 blocks movement of the member 200 along the axis 80b. The member 200 is thus locked or maintained in the unactuated position blocking the inflation fluid from escaping the fill tube 32b.

At the same time that the inflator is actuated to begin providing inflation fluid to the inflatable curtain, the controller 170b begins counting down, as described above in regard to the first embodiment. When the countdown period expires, the controller 170*b* actuates the device 210. Referring to FIG. 7, when the device 210 is actuated, the pin 212 is retracted from the aperture 216 in the side wall 78*b* of the housing 74*b*. As a result, the member 200 is urged by the inflation fluid to move in the housing 74*b* along the axis 80*b* away from the unactuated position, thus unblocking the opening 72*b*.

As the member 200 moves along the axis 80*b* beyond the aperture 86*b*, inflation fluid is released to flow from the fill tube through the chamber 84*b* and out of the pressure release device 70*b* through the aperture 86*b*. This is shown in FIG. 7. Inflation fluid is thus released to flow from the inflatable volume 28 (FIG. 1) of the inflatable curtain 14 through the opening 72*b* (FIG. 7).

The fluid release device 70*b* is therefore actuatable to release or vent inflation fluid from the inflatable volume 28 (FIG. 1) of the inflatable curtain 14 starting a predetermined time after actuation of the inflator 30. This predetermined time may, for example, be at least five seconds. The fluid release device 70*b* (FIGS. 6 and 7) could be adapted to release inflation fluid after a longer period of time, such as starting at least seven seconds or longer after actuation of the inflator. This time is selectable by programming or otherwise adapting the countdown timer function of the controller 170*b*.

Figure 8:
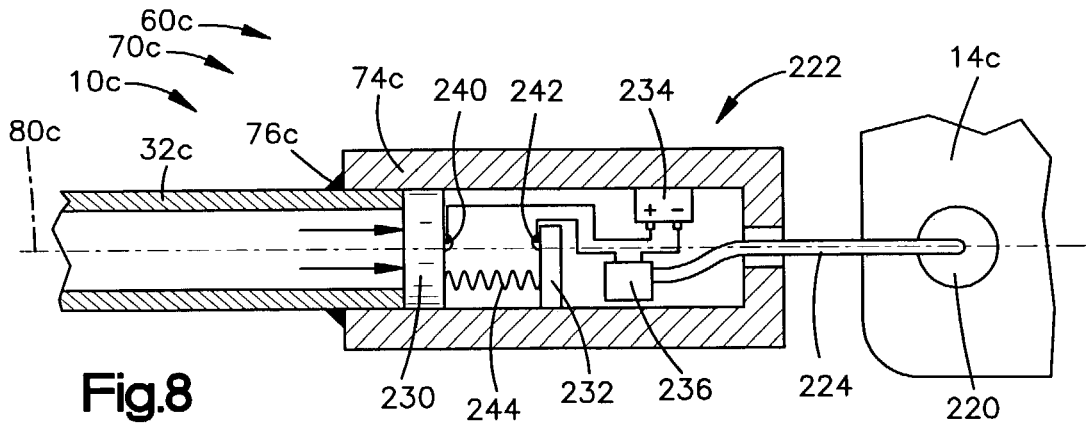
FIGS. 8 and 9 are magnified views, partially in section, of a portion of the apparatus of FIG. 1 showing parts in different positions, according to a fourth embodiment of the present invention.
Figure 9:
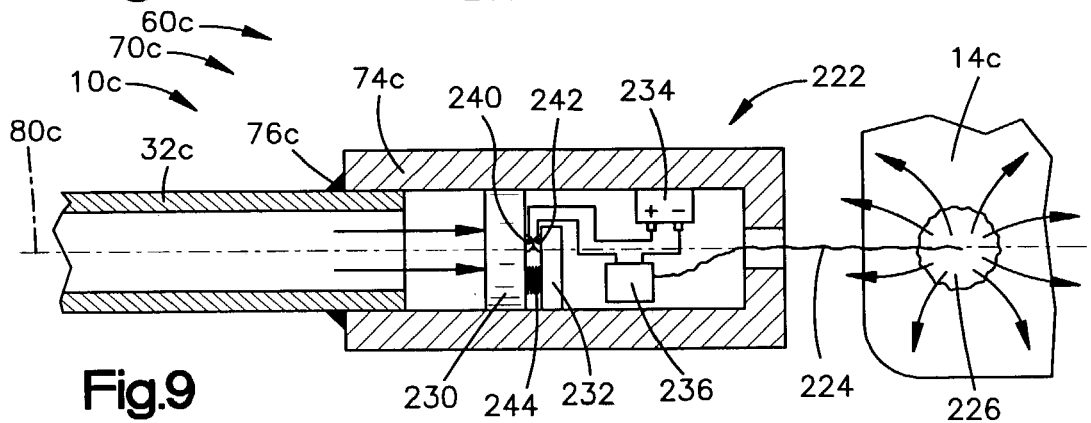

A fourth embodiment of the present invention is illustrated in FIGS. 8 and 9. The fourth embodiment of the present invention has portions similar to portions of the embodiments illustrated in FIGS. 2–7. Accordingly, reference numbers similar to those of FIGS. 2–7 will be utilized in FIGS. 8 and 9, the suffix letter "c" being associated with the reference numbers of FIGS. 8 and 9 to avoid confusion.

According to the fourth embodiment, the apparatus 10*c* includes fluid release means 60*c* associated with the fill tube 32*c* and the inflatable curtain 14*c*. The portion of the fluid release means 60*c* associated with the fill tube 32*c* may be connected to an end portion of the fill tube opposite the inflator, or may be connected to the fill tube along its length by means such as a T-shaped fitting. The portion of the fluid release means 60*c* associated with the inflatable curtain 14*c* may be connected to the curtain at any desired location on the curtain.

The fluid release means 60*c* comprises a device 70*c* having a portion mounted on the fill tube 32*c* and a portion mounted on the inflatable curtain 14*c*. The device 70*c* is actuatable to provide an opening 226 in the inflatable curtain for releasing inflation fluid from the inflatable volume of the inflatable curtain. In the embodiment illustrated in FIGS. 8 and 9, the opening 226 comprises a closed portion of the inflatable curtain that is openable upon actuation of the device 70*c*.

The portion of the fluid release device 70*c* associated with the inflatable curtain 14*c* comprises a pyrotechnic charge 220 (FIG. 8). The pyrotechnic charge 220 is actuatable (i.e., ignitable) to open the opening 226 in the inflatable curtain 14*c*, as shown in FIG. 9.

The portion of the fluid release device 70*c* associated with the fill tube 32*b* comprises an actuator 222 actuatable to cause ignition of the pyrotechnic charge 220 on the inflatable curtain 14*c*. A pyrotechnic member 224, such as a fuse, wick, or pyrotechnic cord, connects the actuator 222 with the pyrotechnic charge 220.

The actuator 222 includes a housing 74*c* that is connected to the fill tube by means, such as a weld 76*c*. The housing 74*c* could be connected to the fill tube 32*c* by alternative means, such as screw threads, clamps, or crimping the housing onto the fill tube. In the embodiment illustrated in FIGS. 8 and 9, the housing 74*c* is a part separate from the fill tube 32*c*. The housing 74*c* could, however, be formed as an integral part of the fill tube 32*c* (i.e., as a single piece with the fill tube).

The housing 74*c* supports a first contact 230 and a second contact 232. The first contact 230 is slidable in the housing 74*c* relative to the second contact 232. The housing 74*c* also supports a source of electrical energy, such as a battery 234, and an electrical ignition source 236. A positive terminal of the battery 234 is electrically connected with a contact pad 240 of the first contact 230. A negative terminal of the battery 234 is electrically connected with the electrical ignition source 236. The electrical ignition source 236 is electrically connected with a contact pad 242 on the second contact 232.

FIG. 8 illustrates an unactuated condition of the actuator 222 and the fluid release device 70*c*. In the unactuated condition, the first contact 230 is spaced from the second contact 232. The first contact 230 is biased away from the second contact 232 by biasing means, such as a spring 244. The spring 244 thus helps maintain the actuator 222 in the unactuated condition. Alternative means, such as a rupturable member (e.g., a crushable rod), could also be used to help maintain the actuator 222 in the unactuated condition.

The fluid release device 70*c* is actuatable in response to actuation of the inflator 30 (FIG. 1). When the inflator 30 is actuated and provides inflation fluid for inflating the inflatable curtain 14*c* via the fill tube 32*c* (FIGS. 8 and 9), the fluid pressure in the fill tube acts on the first contact 230. This is best shown in FIG. 8. As indicated by the arrows in FIG. 8, the first contact 230 is urged by the inflation fluid to move in the housing 74*c* toward the second contact 232.

FIG. 9 illustrates an actuated condition of the actuator 222 and the fluid release device 70*c*. In the actuated condition, the pad 240 on the first contact 230 engages the pad 242 on the second contact 232. As a result, an electrical circuit is completed, and current is provided to the electrical ignition source 236. The ignition source 236, in turn, ignites the pyrotechnic member 224. The pyrotechnic material of the member 224, when ignited, burns starting at the electrical ignition source 236 and progressing toward the pyrotechnic charge 220 on the inflatable curtain 14*c*.

When the burning pyrotechnic material of the pyrotechnic member 224 reaches the pyrotechnic charge 220, the charge is ignited and opens the opening 226 in the inflatable curtain 14*c*. Inflation fluid is thus released from the inflatable curtain 14*c* through the opening 226, as indicated by the arrows in FIG. 9.

The fluid release device 70*c* is actuatable to release or vent inflation fluid from the inflatable volume 28 (FIG. 1) of the inflatable curtain 14 starting a predetermined time after actuation of the inflator 30. This predetermined time may, for example, be at least five seconds. The fluid release device 70*c* (FIGS. 8 and 9) could be adapted to release inflation fluid after a longer period of time, such as starting at least seven seconds or longer after actuation of the inflator. According to the fourth embodiment of the present invention, the amount of time that elapses between actuation of the inflator and release of the inflation fluid depends on the construction and properties of the pyrotechnic member 224.

The amount of time it takes for the pyrotechnic member 224 to burn from the actuator 222 to the pyrotechnic charge 220 depends on the burn rate of the pyrotechnic material in the member and the length of the member. Those skilled in the art will thus appreciate that the time delay between actuation of the inflator and release of inflation fluid from the inflatable curtain 14c may be predetermined based on selection of the pyrotechnic material in the pyrotechnic member 224 and the length of the member. For example, a longer pyrotechnic member 224 or a pyrotechnic member constructed of a slower burning material may serve to increase the time delay. Similarly, a shorter pyrotechnic member 224 or a pyrotechnic member constructed of a faster burning material may serve to increase the time delay.

Figure 10:
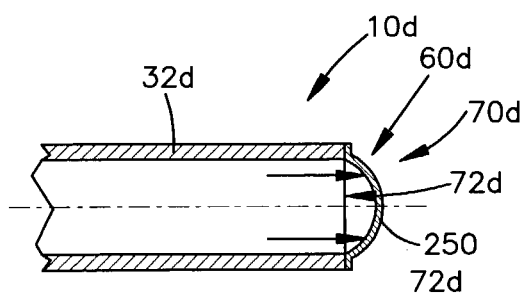
FIGS. 10 and 11 are magnified views, partially in section, of a portion of the apparatus of FIG. 1 showing parts in different positions, according to a fifth embodiment of the present invention.
Figure 11:
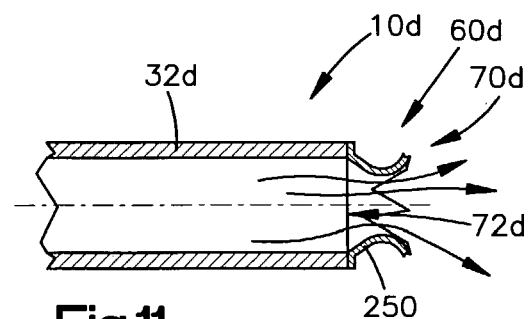

A fifth embodiment of the present invention is illustrated in FIGS. 10 and 11. The fifth embodiment of the present invention has portions similar to portions of the embodiments illustrated in FIGS. 2–9. Accordingly, reference numbers similar to those of FIGS. 2–9 will be utilized in FIGS. 10 and 11, the suffix letter "d" being associated with the reference numbers of FIGS. 10 and 11 to avoid confusion.

According to the fifth embodiment, the apparatus 10d includes fluid release means 60d associated with the fill tube 32d. The fluid release means 60d may be connected to an end portion of the fill tube 32d opposite the inflator (see FIG. 1), or may be connected to the fill tube along its length by means such as a T-shaped fitting.

The fluid release means 60d comprises a device 70d, mounted on the fill tube 32d, that is actuatable to provide an opening 72d in the fill tube for releasing inflation fluid from the inflatable volume of the inflatable curtain. In the embodiment illustrated in FIGS. 10 and 11, the opening 72d comprises an open end of the fill tube 32d. The opening 72d could, however, have an alternative configuration. For example, the opening 72d could be an aperture in an end wall of the fill tube 32d, an aperture in the side wall of the fill tube, or an aperture in a cap or housing connected to the fill tube.

The fluid release means 60d comprises a fluid release device 70d in the form of a rupturable member 250, such as a burst disk. The rupturable member 250 is mounted on the fill tube 32d by means (not shown), such as an adhesive, and covers the opening 72d in the fill tube.

The rupturable member 250 may have a variety of constructions. For example, the rupturable member 250 may be a thin metal plate, a sheet of metal foil, or a sheet of plastic. Although the rupturable member 250 is illustrated as having a domed configuration, the member could have any suitable shape, such as a flat shape.

The device 70d is actuatable to open the opening 72d to release inflation fluid from the inflatable volume 28 (FIG. 1) of the inflatable curtain 14. In the embodiment illustrated in FIGS. 10 and 11, this occurs when the rupturable member 250 ruptures under the pressure of inflation fluid in the fill tube 32d.

The fluid release device 70d is actuatable in response to actuation of the inflator 30 (FIG. 1). When the inflator 30 is actuated and provides inflation fluid for inflating the inflatable curtain 14 via the fill tube 32d (FIGS. 10 and 11), the fluid pressure in the fill tube acts against the rupturable member 250. This is illustrated by the arrows in FIG. 10. When the pressure of the inflation fluid reaches a predetermined level, the device 70d is actuated and the rupturable member 250 bursts. As a result, the inflation fluid is released from the inflatable volume 28 (FIG. 1) of the inflatable curtain 14 through the fill tube 32d and the opening 72d (FIG. 11).

According to the embodiment of FIGS. 10 and 11, the inflation fluid is released as soon as the device 70d is actuated, i.e., as soon as the rupturable member 250 is ruptured. In this embodiment, the apparatus 10d may, however, be adapted such that the inflatable curtain 14 (FIG. 1) remains inflated at the desired pressure for a predetermined time (e.g., at least five seconds). In one such adaptation, the inflatable curtain 14 may be inflated to a pressure above the desired pressure so that the pressure in the curtain remains above the desired pressure for the desired duration even though the fluid is being released from the inflatable volume 28. In another adaptation, the flow area of the opening 72d (FIGS. 10 and 11) may be reduced to a size such that the volumetric flow rate of the inflation fluid is restricted to a level sufficient to ensure that the inflation fluid in the curtain remains at or above the desired pressure for the desired duration.

Figure 12:
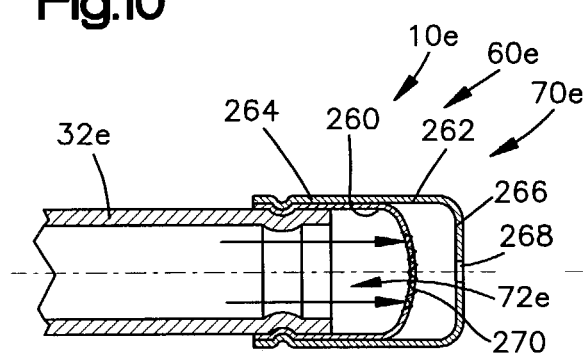
FIGS. 12 and 13 are magnified views, partially in section, of a portion of the apparatus of FIG. 1 showing parts in different positions, according to a sixth embodiment of the present invention.
Figure 13:
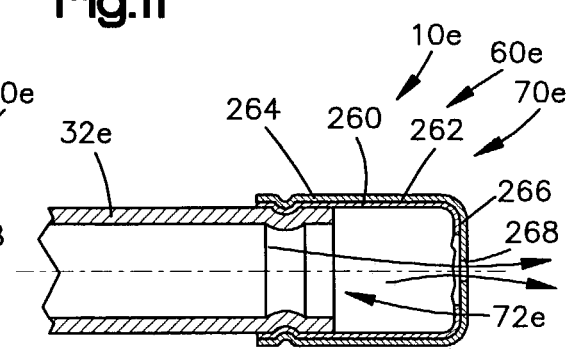

A sixth embodiment of the present invention is illustrated in FIGS. 12 and 13. The sixth embodiment of the present invention has portions similar to portions of the embodiments illustrated in FIGS. 2–11. Accordingly, reference numbers similar to those of FIGS. 2–11 will be utilized in FIGS. 12 and 13, the suffix letter "e" being associated with the reference numbers of FIGS. 12 and 13 to avoid confusion.

According to the sixth embodiment, the apparatus 10e includes fluid release means 60e associated with the fill tube 32e. The fluid release means 60e may be connected to an end portion of the fill tube 32e opposite the inflator (see FIG. 1), or may be connected to the fill tube along its length by means such as a T-shaped fitting.

The fluid release means 60e comprises a device 70e, mounted on the fill tube 32e, that is actuatable to provide an opening 72e in the fill tube for releasing inflation fluid from the inflatable volume of the inflatable curtain. In the embodiment illustrated in FIGS. 12 and 13, the opening 72e comprises an open end of the fill tube 32e. The opening 72e could, however, have an alternative configuration. For example, the opening 72e could be an aperture in an end wall of the fill tube 32e, an aperture in the side wall of the fill tube, or an aperture in a cap or housing connected to the fill tube.

The fluid release means 60e comprises a fluid release device 70e that includes a rupturable piece of material 260, such as a sheet of fabric or plastic film. The fluid release device 70e also includes an end cap 262. The end cap 262 has a generally cup-shaped configuration including a side wall 264 and an end wall 266. An aperture 268 extends through the end wall 266.

The end cap 262 supports the rupturable piece of material 260 on the fill tube 32e. As shown in FIGS. 12 and 13, the end cap 262 is crimped onto the fill tube 32e and thereby clamps the piece of material 260 onto the fill tube. The end cap 262 could be connected to the fill tube 32e by alternative means, such as screw threads, welding, or an adhesive.

The piece of material 260 may have a low gas permeability or may be gas impermeable. For example, the material 260 may be a dense fabric with low gas permeability, a fabric coated to have a low gas permeability, a fabric coated to be gas impermeable, or a plastic film that is gas impermeable. The piece of material 260, when clamped onto the fill tube 32e, thus forms a seal over the opening 72e that has a low gas permeability or is gas impermeable.

As illustrated schematically in FIG. 12, the piece of material 260 may include tear propagation means 270, such as tear stitching or a perforation. The tear propagation means 270 provides an area of the piece of material 260 that has a greater susceptibility to failure under stress.

The device 70e is actuatable to open the opening 72e to release inflation fluid from the inflatable volume 28 (FIG. 1) of the inflatable curtain 14. In the embodiment illustrated in FIGS. 12 and 13, this occurs when the rupturable piece of material 260 ruptures under the pressure of inflation fluid in the fill tube 32e.

The fluid release device 70e is actuatable in response to actuation of the inflator 30 (FIG. 1). When the inflator 30 is actuated and provides inflation fluid for inflating the inflatable curtain 14 via the fill tube 32e (FIGS. 12 and 13), the fluid pressure in the fill tube acts on the rupturable piece of material 260. This is illustrated by the arrows in FIG. 12. When the pressure of the inflation fluid reaches a predetermined level, the device 70d is actuated and the rupturable piece of material 260 tears, breaks, or otherwise fails at the location of the tear propagation means 270. As a result, the inflation fluid is released from the inflatable volume 28 (FIG. 1) of the inflatable curtain 14 through the opening 72e (FIG. 13) and out of the aperture 268 in the end cap 262.

According to the embodiment of FIGS. 12 and 13, the inflation fluid is released as soon as the device 70e is actuated, i.e., as soon as the rupturable piece of material 260 is ruptured. In this embodiment, the apparatus 10e may, however, be adapted such that the inflatable curtain 14 (FIG. 1) remains inflated to the desired pressure for the predetermined duration (e.g., at least five seconds). In one such adaptation, the inflatable curtain 14 may be inflated to a pressure above the desired pressure so that the pressure in the curtain remains above the desired pressure for the desired duration even though the fluid is being released from the inflatable volume 28. In another adaptation, the flow area of the aperture 268 (FIGS. 12 and 13) in the end wall 266 of the end cap 262 may be reduced to a size such that the volumetric flow rate of the inflation fluid is restricted to a level sufficient to ensure that the inflation fluid in the curtain remains at or above the desired pressure for the desired duration.

Figure 14:
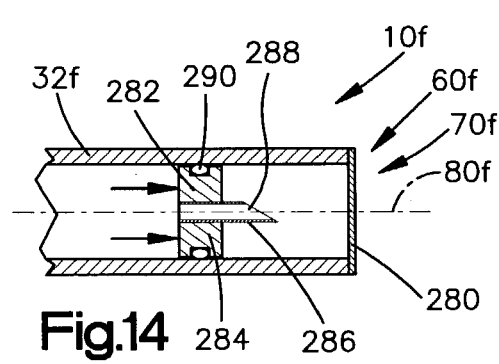
FIGS. 14 and 15 are magnified views, partially in section, of a portion of the apparatus of FIG. 1 showing parts in different positions, according to a seventh embodiment of the present invention.
Figure 15:
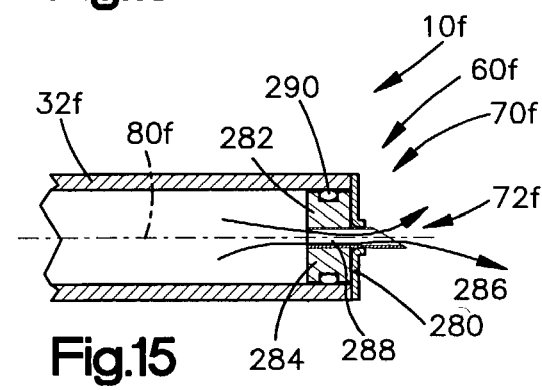

A seventh embodiment of the present invention is illustrated in FIGS. 14 and 15. The seventh embodiment of the present invention has portions similar to portions of the embodiments illustrated in FIGS. 2–13. Accordingly, reference numbers similar to those of FIGS. 2–13 will be utilized in FIGS. 14 and 15, the suffix letter "f" being associated with the reference numbers of FIGS. 14 and 15 to avoid confusion.

According to the seventh embodiment, the apparatus 10f includes fluid release means 60f associated with the fill tube 32f. The fluid release means 60f may be connected to an end portion of the fill tube 32f opposite the inflator (see FIG. 1), or may be connected to the fill tube along its length by means such as a T-shaped fitting.

The fluid release means 60f comprises a device 70f, mounted on the fill tube 32f, that is actuatable to provide an opening 72f in the fill tube for releasing inflation fluid from the inflatable volume of the inflatable curtain. In the embodiment illustrated in FIGS. 14 and 15, the opening 72f comprises an open end of the fill tube 32f. The opening 72f could, however, have an alternative configuration. For example, the opening 72f could be an aperture in an end wall of the fill tube 32f or an aperture in a cap or housing connected to the fill tube.

The fluid release means 60f comprises a fluid release device 70f that includes a rupturable member 280, such as a burst disk. The rupturable member 280 is mounted on the fill tube 32f by means (not shown), such as an adhesive, and covers the opening 72f.

The rupturable member 280 may have a variety of constructions. For example, the rupturable member 280 may be a thin metal plate, a sheet of metal foil, or a sheet of plastic. Although the rupturable member 280 is illustrated as having a flat configuration, the member could have any suitable shape, such as a domed shape.

The fluid release device 70f also includes a member 282 disposed in the fill tube 32f. The member 282 is slidable in the fill tube along an axis 80f. The member 282 includes a piston portion 284 and a lance 286 that extends through the piston portion. The lance 286 includes a central opening 288 that extends along its length. The piston portion 284 may include means 290, such as an O-ring, for helping to form a seal between the piston portion and the fill tube 32f.

In the embodiment of FIGS. 14 and 15, the member 282 is supported in the fill tube 32f and the rupturable member 280 is connected to the fill tube. The apparatus 10f could, however, have an alternative configuration in which the member 282 and the rupturable member 280 are supported by a housing or end cap (not shown) that is fixed to the fill tube 32f by means such as welding, screw threads, or crimping.

The fluid release device 70f is actuatable in response to actuation of the inflator 30 (FIG. 1). The device 70f is actuatable to open the opening 72f to release inflation fluid from the inflatable volume 28 (FIG. 1) of the inflatable curtain 14. When the inflator is actuated and provides inflation fluid for inflating the inflatable curtain 14 via the fill tube 32d (FIGS. 10 and 11), the fluid pressure in the fill tube acts on the piston portion 284 of the member 282. This is illustrated by the arrows in FIG. 14.

When the inflation fluid acts on the piston portion 284 of the member 282, the member is urged to slide along the axis 80f toward the rupturable member 280. When the member 282 reaches the rupturable member 280, the lance 286 punctures or otherwise ruptures the rupturable member. Once the lance 286 puctures the rupturable member 280, inflation fluid exits the fill tube 32f through the opening 288 in the lance. As a result, the inflation fluid is released from the inflatable volume 28 (FIG. 1) of the inflatable curtain 14 through fill tube 32f and the opening 288.

According to the embodiment of FIGS. 14 and 15, the inflation fluid is released as soon as the device 70f is actuated, i.e., as soon as the lance 286 punctures the rupturable member 280. In this embodiment, the apparatus 10f may, however, be adapted such that the inflatable curtain 14 (FIG. 1) remains inflated to the desired pressure for the predetermined duration (e.g., at least five seconds). In one such adaptation, the inflatable curtain 14 may be inflated to a pressure above the desired pressure so that the pressure in the curtain remains above the desired pressure for the desired duration in spite of the fluid being released from the inflatable volume 28. In another adaptation, the flow area of the opening 288 in the lance (FIGS. 14 and 15) may be reduced to a size such that the volumetric flow rate of the inflation fluid is restricted to a level sufficient to ensure that the inflation fluid in the curtain remains at or above the desired pressure for the desired duration.

Figure 16:
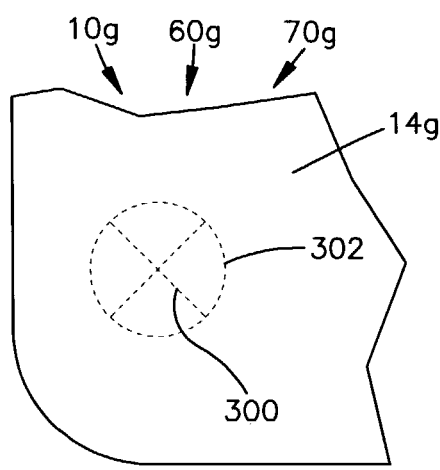
FIGS. 16 and 17 are magnified views of a portion of the apparatus of FIG. 1 showing parts in different positions, according to an eighth embodiment of the present invention.
Figure 17:
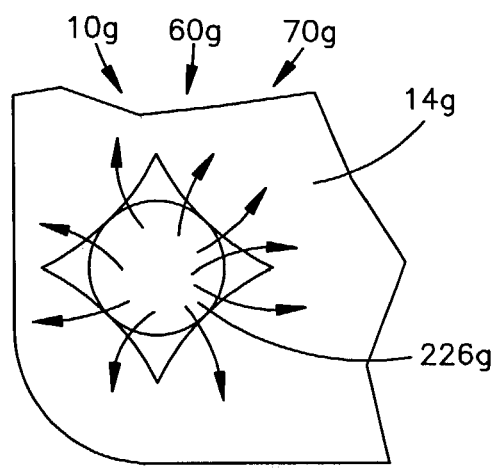

A eighth embodiment of the present invention is illustrated in FIGS. 16 and 17. The eighth embodiment of the present invention has portions similar to portions of the embodiments illustrated in FIGS. 2–15. Accordingly, reference numbers similar to those of FIGS. 2–15 will be utilized in FIGS. 16 and 17, the suffix letter "g" being associated with the reference numbers of FIGS. 16 and 17 to avoid confusion.

According to the eighth embodiment, the apparatus log includes fluid release means 60g associated with the inflatable curtain 14g. The fluid release means 60g may be connected to the inflatable curtain 14g at any desired location on the curtain.

The fluid release means 60g comprises a device 70g, mounted on the inflatable curtain 14g, that is operable to provide an opening 226g for releasing inflation fluid from the inflatable volume of the curtain. In the embodiment illustrated in FIGS. 16 and 17, the opening 226g comprises an opening in the inflatable curtain 14g.

The fluid release means 60g comprises a fluid release device 70g in the form of tear propagation means 300, such as such as tear stitching or a perforation in the material used to construct the inflatable curtain 14g. The tear propagation means 300 provides an area of the inflatable curtain 14g that has a greater susceptibility to failure under stress. The inflatable curtain 14g may be reinforced in the area of the tear propagation means 300 by means such as reinforcing stitching 302.

The device 70g is actuatable to open the opening 226g to release inflation fluid from the inflatable volume of the inflatable curtain 14g. In the embodiment illustrated in FIGS. 16 and 17, this occurs when the tear propagation means 300 ruptures under the pressure of inflation fluid in the inflatable curtain 14g.

The fluid release device 70g is actuatable in response to actuation of the inflator 30 (FIG. 1). When the inflator 30 is actuated and provides inflation fluid for inflating the inflatable curtain 14g (FIGS. 16 and 17), the fluid pressure in the curtain acts on the tear propagation means 300. When the inflation fluid pressure in the inflatable curtain 14g reaches a predetermined level, the device 70g is actuated and the curtain material tears, breaks, or otherwise fails at the location of the tear propagation means 300. As a result, the inflation fluid is released from the inflatable curtain 14g through the opening 226g.

The fluid release device 70g is therefore actuatable to release or vent inflation fluid from the inflatable volume 28 (FIG. 1) of the inflatable curtain 14g. According to the eighth embodiment of FIGS. 16 and 17, the inflation fluid is released as soon as the device 70g is actuated, i.e., as soon as the material of the inflatable curtain 14g tears or otherwise fails. In this embodiment, the apparatus 10g may, however, be adapted such that the inflatable curtain 14g remains inflated to the desired pressure for the predetermined duration (e.g., at least five seconds). In one such adaptation, the inflatable curtain 14g may be inflated to a pressure above the desired pressure so that the pressure in the curtain remains above the desired pressure for the desired duration even though the fluid is being released from the inflatable curtain. In another adaptation, the flow area of the opening 226g in the inflatable curtain 14g may be reduced to a size such that the volumetric flow rate of the inflation fluid is restricted to a level sufficient to ensure that the inflation fluid in the curtain remains at or above the desired pressure for the desired duration.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for helping to protect an occupant of a vehicle that has a side structure and a roof, said apparatus comprising:
an inflatable curtain that is inflatable away from the roof between the side structure of the vehicle and a vehicle occupant, said inflatable curtain having an inflatable volume;
an inflation fluid source actuatable to provide inflation fluid to said inflatable volume to inflate said inflatable curtain;
a fill tube for delivering the inflation fluid from said inflation fluid source to said inflatable curtain; and
an actuatable device actuatable to provide a first opening in at least one of said fill tube and said inflatable curtain for directing said inflation fluid from said inflatable volume to deflate said inflatable curtain, said actuatable device being actuatable in response to actuation of said inflation fluid source, said actuatable device comprising a piston member having a stem and a piston head, said stem being movable to provide said first opening, said piston head movable with said stem to provide a second opening in said apparatus for directing inflation fluid from said first opening to deflate said inflatable curtain.

2. The apparatus recited in claim 1, wherein said actuable means is adapted to release said inflation fluid from said inflatable curtain starting a predetermined time after actuation of said inflation fluid source.

3. The apparatus recited in claim 2, wherein said predetermined time is at least five seconds.

4. The apparatus recited in claim 1, wherein said movable member moves along a straight line.

5. Apparatus for helping to protect an occupant of a vehicle that has a side structure and a roof, said apparatus comprising:
an inflatable curtain that is inflatable away from the roof between the side structure of the vehicle and a vehicle occupant, said inflatable curtain having an inflatable volume;
an inflation fluid source actuatable to provide inflation fluid to said inflatable volume to inflate said inflatable curtain;
a fill tube for delivering the inflation fluid from said inflation fluid source to said inflatable curtain;
actuatable means for providing an opening in at least one of said fill tube and said inflatable curtain for directing said inflation fluid from said inflatable volume to deflate said inflatable curtain, said actuatable means being actuatable in response to actuation of said inflation fluid source,
wherein said opening comprises an opening in said fill tube, said actuatable means comprising a device actuatable to provide said opening in said fill tube after inflation of said curtain for releasing said inflation fluid from said inflatable curtain.

6. The apparatus recited in claim 5, wherein said device comprises a member movable from an unactuated condition blocking said opening to an actuated condition unblocking said opening.

7. The apparatus recited in claim 6, wherein said member is urged to move from said unactuated condition to said actuated condition under the pressure of said inflation fluid acting on said member when said inflation fluid source is actuated.

8. The apparatus recited in claim 7, wherein said device further comprises means for maintaining said member in said unactuated condition after said inflation fluid source is actuated, said means for maintaining thereafter permitting said member to move to said actuated condition to release said inflation fluid starting a predetermined time after said inflation fluid source is actuated.

9. The apparatus recited in claim 8, wherein said means for maintaining comprises a device that blocks said member from moving from said unactuated condition toward said actuated condition, said device that blocks said member being actuatable to permit said member to move from said unactuated condition to said actuated condition to release said inflation fluid from said inflatable curtain.

10. The apparatus recited in claim 9, further comprising means for controlling actuation of said device that blocks said member, said means for controlling being operative to actuate said device that blocks said member to permit said member to move from said unactuated condition to said actuated condition to release said inflation fluid from said inflatable curtain starting a predetermined time after actuation of said inflation fluid source.

11. The apparatus recited in claim 9, wherein said device that blocks said member comprises a solenoid actuatable to move said member from said unactuated condition to said actuated condition.

12. The apparatus recited in claim 9, wherein said device that blocks said member comprises a solenoid actuatable to release said member to move under the pressure of said inflation fluid from said unactuated condition to said actuated condition.

13. The apparatus recited in claim 5, wherein said device comprises a housing connected to said fill tube, said housing having a chamber in fluid communication with said opening of said fill tube and an aperture that provides fluid communication between said chamber and an exterior of said housing, said device further comprising a member disposed in said chamber, said member having an unactuated condition blocking flow of said inflation fluid through said opening, said member being movable to an actuated condition to release said inflation fluid to flow through said opening and through said aperture.

14. The apparatus recited in claim 5, wherein said device comprises a rupturable member connected to said fill tube and covering said opening, said rupturable member being rupturable in response to inflation fluid pressure in said fill tube, said rupturable member when ruptured releasing said inflation fluid to flow from said inflatable curtain through said opening.

15. The apparatus recited in claim 14, wherein said rupturable member comprises a burst disk.

16. The apparatus recited in claim 14, wherein said device further comprises a member including a lance having a central passage, said member being slidable toward said rupturable member in response to inflation fluid pressure in said fill tube, said lance being operative to puncture said rupturable member to actuate said rupturable member from an unactuated condition blocking inflation fluid flow through said opening to an actuated condition permitting inflation fluid flow through said opening via said central passage in said lance.

17. The apparatus recited in claim 14, wherein said rupturable member comprises a piece of material connected to said fill tube covering said opening, said piece of material including tear propagation means, said piece of material being actuatable from an unactuated condition blocking inflation fluid flow through said opening to an actuated ruptured condition in which said tear propagation means ruptures in response to said inflation fluid pressure in said fill tube to permit inflation fluid flow through said opening.

18. The apparatus recited in claim 17, wherein said device further comprises an end cap connected to said fill tube overlying said piece of material and helping to support said piece of material on said fill tube, said end cap including an aperture through which said inflation fluid flows when said piece of material ruptures and releases said inflation fluid to flow from said inflatable curtain through said opening.

19. The apparatus recited in claim 5, wherein said device is adapted to maintain inflation fluid pressure in said inflatable curtain above a predetermined pressure for a predetermined time starting when said inflation fluid source is actuated while simultaneously releasing said inflation fluid from said inflatable curtain through said opening.

20. The apparatus recited in claim 19, wherein said inflation fluid source is adapted to provide inflation fluid to inflate said inflatable curtain to a pressure above said predetermined pressure so that said inflation fluid released from said inflatable curtain through said opening is insufficient to reduce the pressure in said inflatable curtain to below said predetermined pressure for a predetermined time starting after actuation of said inflation fluid source.

21. The apparatus recited in claim 19, wherein said opening is sized such that the volumetric flow rate of said inflation fluid released through said opening is insufficient to reduce the pressure in said inflatable curtain to below said predetermined pressure for at least five seconds starting after actuation of said inflation fluid source.

22. Apparatus for helping to protect an occupant of a vehicle that has a side structure and a roof, said apparatus comprising:
an inflatable curtain that is inflatable away from the roof between the side structure of the vehicle and a vehicle occupant, said inflatable curtain having an inflatable volume;
an inflation fluid source actuatable to provide inflation fluid to said inflatable volume to inflate said inflatable curtain;
a fill tube for delivering the inflation fluid from said inflation fluid source to said inflatable curtain;
actuatable means for providing an opening in at least one of said fill tube and said inflatable curtain for directing said inflation fluid from said inflatable volume to deflate said inflatable curtain, said actuatable means being actuatable in response to actuation of said inflation fluid source,
wherein said opening comprises an opening in said fill tube, said actuatable means comprising a device actuatable to provide said opening in said fill tube for releasing said inflation fluid from said inflatable curtain,
wherein said device comprises a member movable from an unactuated condition blocking said opening to an actuated condition unblocking said opening,
wherein said member is urged to move from said unactuated condition to said actuated condition under the pressure of said inflation fluid acting on said member when said inflation fluid source is actuated,
wherein said device further comprises means for maintaining said member in said unactuated condition after said inflation fluid source is actuated, said means for maintaining thereafter permitting said member to move to said actuated condition to release said inflation fluid starting a predetermined time after said inflation fluid source is actuated,
wherein said means for maintaining comprises a body of viscous material that resists movement of said member from said unactuated condition toward said actuated condition, said member when urged toward said actuated condition under the pressure of said inflation fluid displacing said viscous material which permits movement of said member toward said actuated condition.

23. Apparatus for helping to protect an occupant of a vehicle that has a side structure and a roof, said apparatus comprising:

an inflatable curtain that is inflatable away from the roof between the side structure of the vehicle and a vehicle occupant, said inflatable curtain including an inflatable volume;

an inflation fluid source actuatable to provide inflation fluid to said inflatable volume for inflating said inflatable curtain;

a mechanism for releasing said inflation fluid to flow from said inflatable volume starting at least five seconds after actuation of said inflation fluid source to deflate said inflatable curtain, a fill tube for delivering said inflation fluid from said inflation fluid source to said inflatable curtain, said mechanism being connected to said fill tube and being actuatable to provide an opening in said fill tube for releasing said inflation fluid from said inflatable curtain.

24. Apparatus for helping to protect an occupant of a vehicle that has a side structure and a roof, said apparatus comprising:

an inflatable curtain that is inflatable away from the roof between the side structure of the vehicle and a vehicle occupant;

an inflation fluid source actuatable to provide inflation fluid for inflating said inflatable curtain;

a fill tube for delivering the inflation fluid from the inflation fluid source to the inflatable curtain, said fill tube having a portion positioned in said inflatable curtain; and a device mounted on said fill tube actuable after inflation of said curtain for releasing the inflation fluid from said inflatable curtain.

25. The apparatus recited in claim 24, wherein said device comprises a housing connected to said fill tube, said housing having a chamber in fluid communication with an opening of said fill tube and an aperture that provides fluid communication between said chamber and an exterior of said housing, said device further comprising a member disposed in said chamber, said member having an unactuated condition blocking flow of said inflation fluid through said opening, said member in response to actuation of said inflation fluid source being movable to an actuated condition to release said inflation fluid to flow through said opening and through said aperture to release said inflation fluid from said inflatable curtain.

26. Apparatus for helping to protect an occupant of a vehicle that has a side structure and a roof, said apparatus comprising:

an inflatable curtain that is inflatable away from the roof between the side structure of the vehicle and a vehicle occupant, said inflatable curtain having an inflatable volume;

an inflation fluid source actuatable to provide inflation fluid to said inflatable volume to inflate said inflatable curtain;

a fill tube for delivering the inflation fluid from said inflation fluid source to said inflatable curtain;

an actuatable device actuatable to provide a first opening in at least one of said fill tube and said inflatable curtain for directing said inflation fluid from said inflatable volume to deflate said inflatable curtain, said actuatable device being actuatable in response to actuation of said inflation fluid source, said device comprising a member movable along a straight line to provide a first opening, said member being movable to provide a second opening in said apparatus for directing inflation fluid from said first opening to deflate said inflatable curtain.

27. The apparatus recited in claim 26, wherein said second opening is in said inflatable curtain, said device comprising a pyrotechnic charge ignitable to provide said second opening in said inflatable curtain and means for igniting said pyrotechnic charge to provide said second opening and release said inflation fluid from said inflatable curtain starting a predetermined time after actuation of said inflation fluid source.

28. The apparatus recited in claim 27, wherein said means for igniting comprises a pyrotechnic member connected to said pyrotechnic charge and an electrical ignition source operatively connected to said pyrotechnic member, said electrical ignition source being operative to ignite said pyrotechnic member in response to actuation of said inflation fluid source, said pyrotechnic member being operative to combust starting from said electrical ignition source and burning toward said pyrotechnic charge, said burning pyrotechnic member when reaching said pyrotechnic charge igniting said pyrotechnic charge to release said inflation fluid from said inflatable curtain starting a predetermined time after actuation of said inflation fluid source.

29. The apparatus recited in claim 28, wherein said means for igniting comprises a housing connected to said fill tube and having a chamber in fluid communication with said fill tube, said member being a first contact disposed in said chamber, said means for igniting further comprising an electrical source and a second contact disposed in said chamber, said first contact being movable in said chamber relative to said second contact, said means for igniting having an unactuated condition in which said first contact is spaced from said second contact, said inflation fluid acting on said first contact to move said first contact into engagement with said second contact in response to actuation of said inflation fluid source, said first contact when engaging said second contact completing an electrical circuit in which electrical current from said electrical source is provided to said electrical ignition source to effectuate ignition of said pyrotechnic member.

* * * * *